US006504547B1

(12) United States Patent
Mercer

(10) Patent No.: US 6,504,547 B1
(45) Date of Patent: Jan. 7, 2003

(54) STANDARDIZATION OF GRAPHICS SYSTEM LOGICAL FRAME BUFFER

(75) Inventor: Paul Mercer, Palo Alto, CA (US)

(73) Assignee: Pixo, Inc., Cupertino, CA (US)

( * ) Notice: Subject to any disclaimer, the term of this patent is extended or adjusted under 35 U.S.C. 154(b) by 0 days.

(21) Appl. No.: 09/374,468

(22) Filed: Aug. 13, 1999

(51) Int. Cl.[7] .......................... G06F 15/16; G06T 15/00
(52) U.S. Cl. ...................... 345/503; 345/522; 345/545; 345/537; 709/323; 709/328
(58) Field of Search .................................. 345/145, 501, 345/520, 503, 522, 526, 509, 537, 545, 558; 709/323, 324, 328

(56) References Cited

U.S. PATENT DOCUMENTS

| | | | | | |
|---|---|---|---|---|---|
| 5,241,625 A | * | 8/1993 | Epard et al. | ................. | 395/502 |
| 5,289,574 A | * | 2/1994 | Sawyer | ........................ | 345/759 |
| 5,491,813 A | * | 2/1996 | Bondy et al. | ................ | 345/520 |
| 5,504,928 A | * | 4/1996 | Cook et al. | | |
| 5,523,769 A | * | 6/1996 | Lauer et al. | .................... | 345/1 |
| 5,734,387 A | * | 3/1998 | Patrick et al. | ............... | 345/441 |
| 5,745,761 A | * | 4/1998 | Celi et al. | .................... | 345/522 |
| 5,748,866 A | * | 5/1998 | Edgar | ......................... | 345/428 |
| 5,818,469 A | * | 10/1998 | Lawless et al. | ............. | 345/522 |
| 5,920,688 A | * | 7/1999 | Cooper et al. | ............... | 345/437 |
| 5,982,399 A | * | 11/1999 | Scully et al. | ................ | 345/522 |
| 5,990,911 A | * | 11/1999 | Arrott et al. | ................. | 345/506 |
| 6,088,005 A | * | 7/2000 | Walls et al. | .................. | 345/1.1 |

* cited by examiner

Primary Examiner—Ulka J. Chauhan
(74) Attorney, Agent, or Firm—Fliesler Dubb Meyer & Lovejoy LLP

(57) ABSTRACT

A method for implementing a bitmapped graphics system involves creating a logical frame buffer for a program. The method attaches a standardization operation to the logical frame buffer, so that the standardization operation is automatically executed upon the invocation of draw function by an application. The standardization operation serves to perform all of the functions required to properly transmit the contents of the logical frame buffer into the hardware frame buffer, arbitrates access to the logical frame buffer, if necessary, and performs other useful logical operations. In the preferred embodiment, the standardization operation comprises a complementary pre-process and a post-process. The pre-process is invoked prior to the execution of a graphics system draw operation, while the post-process is invoked thereafter. The pre-process and post-process may include more than one distinct pre-function and post-function. The post-functions are executed in last-in-first-out order relative to their order of operations, while the pre-functions are executed in first-in-first-out order relative to their order of operations. According to another aspect, a device executes an application draw function using the above-described uniform, standardized graphic system. A complementary pre-process and post-process removes the complexity of dealing with hiding the cursor prior to drawing into the frame buffer and showing the cursor after drawing into the frame buffer. Another example involves handling communication peculiarities, such as transporting the contents of the logical frame buffer across a parallel port to a hardware frame buffer which is not directly addressable by the processor. Yet another example involves logical frame buffer rotation to counteract peculiar rotation states wired into the hardware frame buffer. Still another example involves arbitrating access to a logical frame buffer which is accessible by more than one application.

20 Claims, 6 Drawing Sheets

STANDARDIZATION OF GRAPHICS SYSTEM LOGICAL FRAME BUFFER

BACKGROUND OF THE INVENTION

1. Field of the Invention

The present invention pertains to the field of computing devices having displays. Specifically, the present invention pertains to the field of bitmapped graphics systems which are used by applications running on computing devices to write into a display device.

2. Discussion of the Related Art

A frame buffer is a memory space used to represent a bitmapped image for display. A hardware frame buffer is a frame buffer that is accessed by a hardware display device to display an image on a screen. A logical frame buffer is a frame buffer that can be used by applications to draw into. In some instances, the logical frame buffer and hardware frame buffer are coincident, in other words are the same frame buffer. A given computer system will often have multiple logical frame buffers, for example in a window-based computing system, while having only one or a small number of hardware frame buffers.

Computing devices having displays thus often include a hardware frame buffer which is readable by a hardware display device. However, the orientation of the hardware frame buffer to the actual display pixel matrix often varies from device to device. Another peculiarity of display systems include the fact that in some devices the hardware frame buffer is not directly addressable as a memory mapped space by the processor of the device. Yet another complication arises in the context of complex computing systems, wherein more than one application may be permitted to write into a single logical frame buffer. In this case, controlled access to the logical frame buffer may be required. Still another complication arises in the context of a device having a software cursor, in which it is desirable to restore the portion of the image masked over by the cursor before altering the image, and then to redraw the cursor after the image has been altered.

Conventionally, these and other peculiarities of display systems must be handled by meticulous construction of the graphics portion of applications by the application programmer. The solutions to these problems frequently occupies a large program space and requires extensive programming effort. Moreover, the programming effort must be duplicated in large part for each different type of hardware device for which the application is anticipated to run on.

As is apparent from the above discussion, a need exists for providing a uniform, standardized graphics interface for applications to write into, without needing to worry about all the potentially variable details of the actual display device. A need also exists for a method for generating a uniform, standardized graphics system for a particular device without requiring excessive programming effort or program space to implement the graphics system.

SUMMARY OF THE INVENTION

Computing devices often include a hardware frame buffer which is readable by a hardware display device. However, the orientation of the hardware frame buffer to the actual display pixel matrix often varies from device to device. Another peculiarity of display systems include the fact that in some devices the hardware frame buffer is not directly addressable as a memory mapped space by the processor of the device. Conventionally, these and other peculiarities of display systems must be handled by meticulous construction of the graphics portion of applications by the application programmer. An object of the present invention is to provide a uniform, standardized graphics interface for applications to write into, without needing to worry about all the potentially variable details of the actual display device. Another object of the present invention is to provide a method for generating a uniform, standardized graphics system for a particular device without requiring excessive programming effort or program space to implement the graphics system.

According to an aspect of the present invention, a method for implementing a bitmapped graphics system involves creating a logical frame buffer for a program, such as an application or operating system. The method attaches a standardization operation to the logical frame buffer, so that the standardization operation is automatically executed upon the invocation of a draw function by the application. The standardization operation serves to perform all of the functions required to properly transmit the contents of the logical frame buffer into the hardware frame buffer. The standardization operation also arbitrates access to the logical frame buffer, if desired, and performs other useful logical operations.

In the preferred embodiment, the standardization operation comprises a pre-process and a post-process; thus, the pre-process and post-process are complementary to one other. The pre-process is invoked prior to the execution of a graphics system draw operation. The post-process is invoked after the execution of the graphics system draw operation. The pre-process and post-process may include more than one distinct pre-function and post-function. Pre-functions are executed in the order in which they are installed (FIFO) and post-functions are executed in the reverse order of installation (LIFO). This provides robustness and permits the functions to be arbitrarily combined as required by the peculiarities of the hardware display device.

According to another aspect of the present invention, a device executes an application draw function using the above-described uniform, standardized graphic system. The graphics system receives an invocation of the application draw function from the application, performs the pre-process, performs the actual graphics system draw operation into the logical frame buffer, and then executes the post-process.

For example, a complementary pre-process and post-process according to the present invention removes the complexity of dealing with hiding the cursor prior to drawing into the frame buffer and showing the cursor after drawing into the frame buffer, as is frequently required for software cursor implementations. A pre-process removes the cursor from the logical frame buffer, replacing it with the image the cursor had covered. A post-process redraws the cursor into the logical frame buffer after the application draw has finished.

Another example involves handling communication peculiarities, such as transporting the contents of the logical frame buffer across a parallel port to a hardware frame buffer which is not directly addressable by the processor. Yet another example involves logical frame buffer rotation to counteract peculiar rotation states wired into the hardware frame buffer. Still another example involves arbitrating access to a logical frame buffer which is accessible by more than one application.

These and other features, aspects, and advantages of the present invention are fully discussed in the Detailed Description of the Invention which describes the Figures in narrative form, in which like parts are designated with like reference numerals.

BRIEF DESCRIPTION OF THE DRAWINGS

In the Figures, like parts or method steps are labeled with like numerals. The Figures are more fully explained in narrative form in the Detailed Description of the Invention.

DETAILED DESCRIPTION OF THE INVENTION

Figure 1:
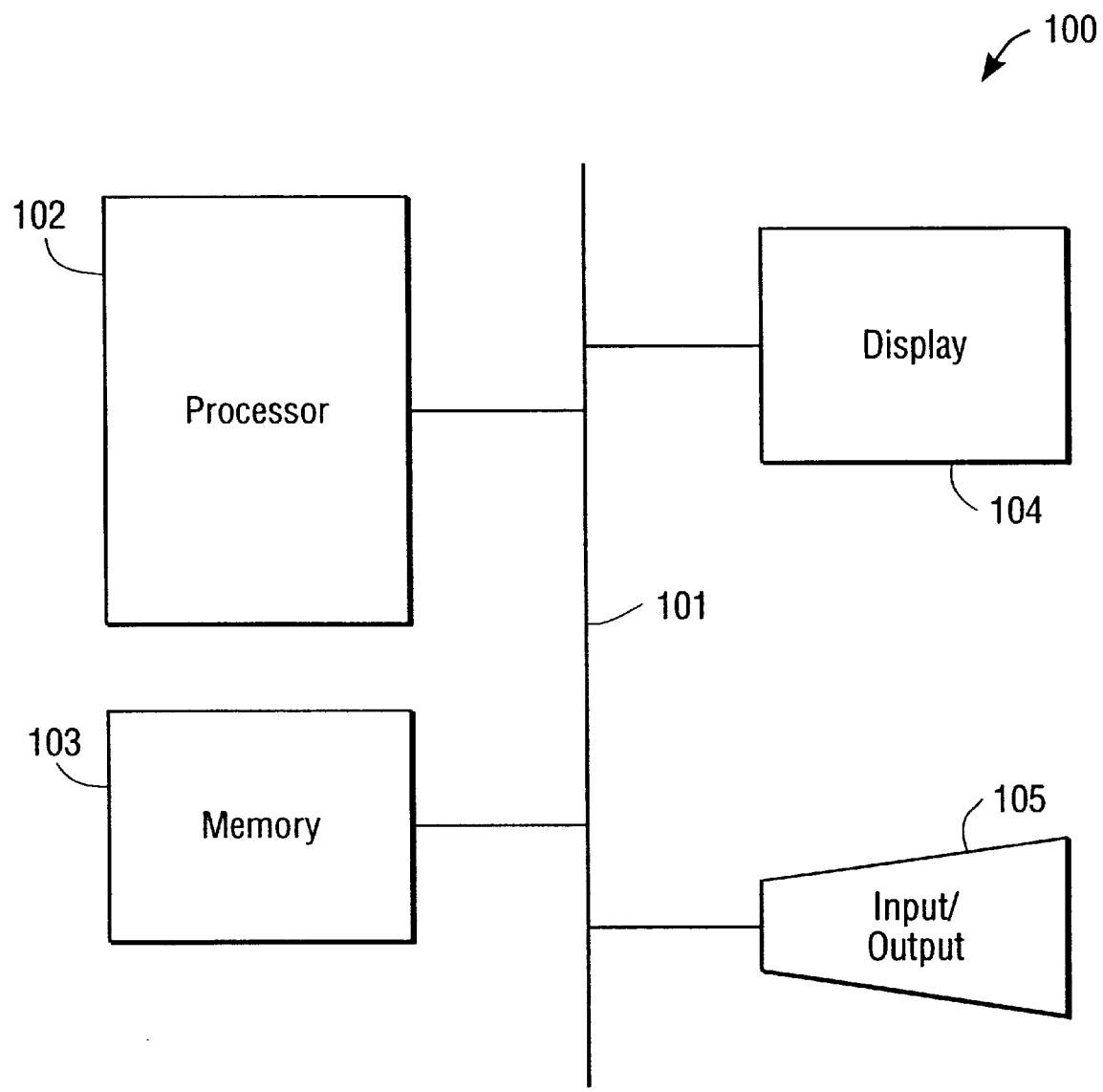
FIG. 1 illustrates a general purpose computer architecture suitable for implementing the methods according to the present invention.

FIG. 1 illustrates general purpose computer architecture 100 suitable for implementing the methods according to the present invention. A processor 102 is connected to an internal bus 101 having address, data, and control lines (not shown). Also attached to the data bus 101, is a memory device 103, such as RAM which stores program instructions executed by processor 102 as well as data which is read and/or written by the programs executed by processor 102. The general purpose computer architecture 100 also includes a display device 104, as will be discussed later in more detail. An input/output device 105 logically represents other forms of communication to and from the general purpose computer architecture such as user input from a keyboard or mouse, an interface to a secondary storage device, such as a hard disk, and a network interface.

Figure 2:
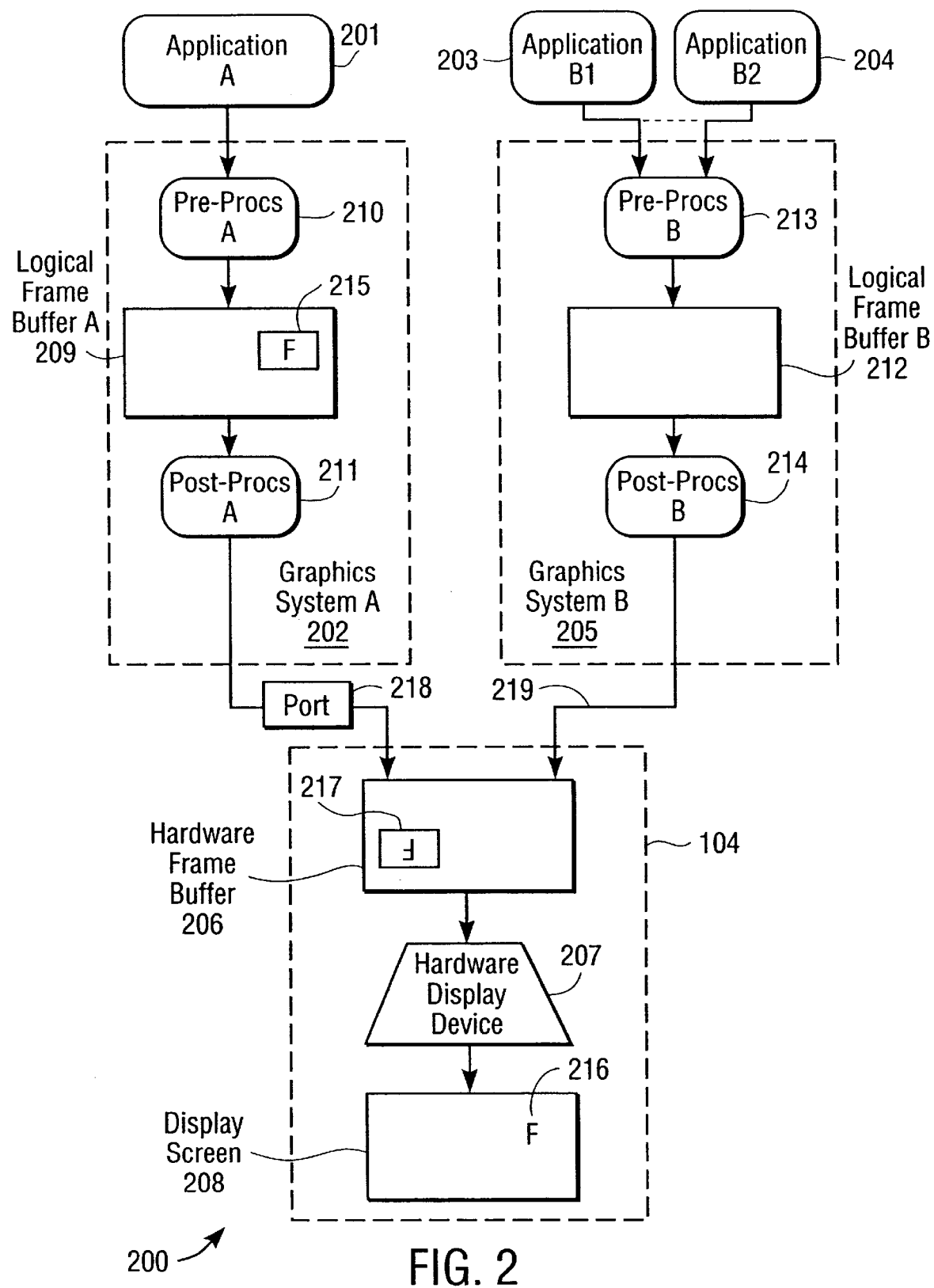
FIG. 2 illustrates three applications which interact with two graphics systems designed according to the methods of the present invention.

FIG. 2 illustrates three applications which interact with two graphics systems designed according to the methods of the present invention. Application A 201 performs application draw functions which are executed by graphic system A 202. Application B1 203 and application B2 204 perform application draw functions which are executed by graphic system B 205. Display 104 as illustrated in FIG. 1 includes hardware frame buffer 206, hardware display device 207, and display screen 208 as shown in FIG. 2. Hardware frame buffer 206 provides physical storage used to represent a bitmapped image for display. Hardware display device 207 reads the contents of the hardware frame buffer 206, interprets the contents, and creates a display screen appearance on display screen 208. Graphics system A 202 constructed according to the present invention includes a logical frame buffer A 209, pre-process A 210 and post-process A 211. A logical frame buffer is a frame buffer that can be used by applications to draw into. A given computer system will often have multiple logical frame buffers (such as corresponding to multiple processes) while having only one or a small number of hardware frame buffers. Pre-process A 210 and post-process A 211 together represent a standardization operation according to the present invention. Standardization of a logical frame buffer format is performed such that a linear sequence of contiguous memory represents the bitmapped image within the logical frame buffer. Graphics system B 205 includes logical frame buffer B 212, pre-process B 213, and post-process B 214. Together, pre-process B 213 and post-process B 214 represent another standardization operation according to the present invention. Logical frame buffer A 209 is a portion of memory 103 used to represent a bitmapped image. At various times, some, all, or none of the contents of logical frame buffer A 209 are written into the hardware frame buffer 206. Similarly, logical frame buffer B 212 contains a bitmapped image. Some, all, or none of the contents of logical frame buffer B 212 is written into hardware frame buffer 206. If the procedure flow 200 illustrated in FIG. 2 is implemented on a computing device having a window-type operating system, then application A 201 may be running in an open window, which occupies the entire display screen 208. Applications B1 203 and B2 204 are running on the computing device 100, but are not currently selected for display on the display screen 208. Thus, although the logical frame buffer B 212 is written by application B1 203 and application B2 204, the resulting bitmapped image is not written into the hardware buffer 206 until the associated window corresponding to applications B1 203 and B2 204 is opened. Application A 201 writes into the logical frame buffer A 209 without concern for which part, if any, of the bitmapped image it is creating is displayed on the display screen 208. Similarly, application B1 203 and B2 204 write into logical frame buffer B 212 without concern as to whether or not the contents they are currently generating are being displayed on the display screen 208.

Figure 3:
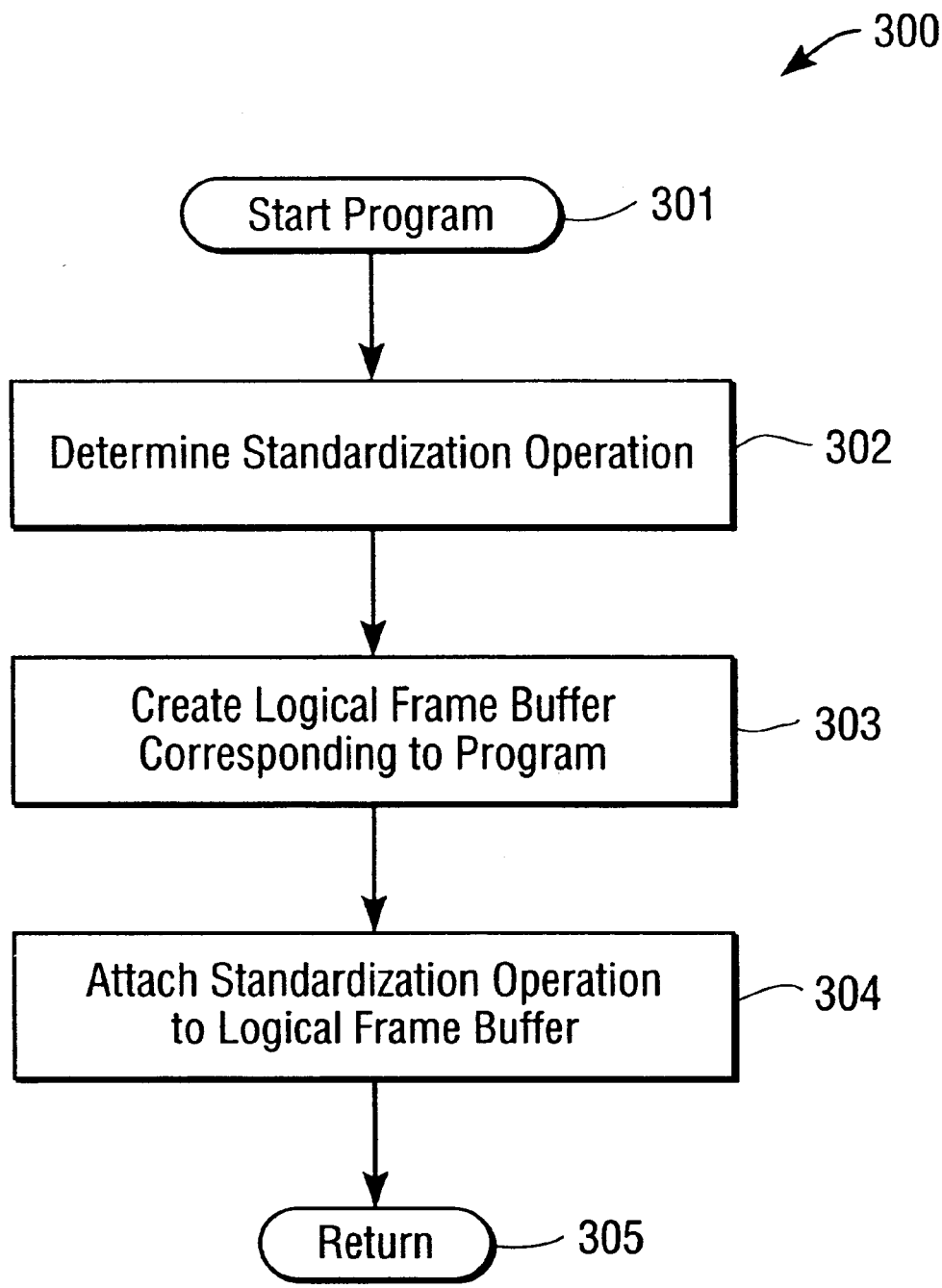
FIG. 3 illustrates a method of creating a graphics system according to the present invention.

FIG. 3 illustrates a method of creating a graphics system according to the present invention. The method is invoked at step 301 by the start of a program. The program, for purposes of describing the present invention, is either an application program or the underlying operating system itself. At step 302, the method determines a standardization operation appropriate for the program. The standardization operation determined in step 302 is a function of the type of display 104 that resides on the computing system 100. The hardware display device 207 illustrated in FIG. 2 may perform a rotation upon the contents of the hardware frame buffer 206 before writing its interpretation of the contents of the hardware frame buffer 206 onto the display screen 208. Such a rotation occurs, for example, dependent upon the way that the hardware display device 207 is physically wired to the hardware frame buffer 206. The standardization operation chosen in step 302 is also a function of the relationship of the hardware frame buffer 206 to the other elements of the computing system 100. For example, the standardization operation determined in step 302 must accomplish the transporting of the selected portion of the logical frame buffer to the hardware frame buffer regardless of whether or not the hardware frame buffer 206 is directly addressable as memory mapped space by the processor 102. The standardization operation determined in step 302 is also a function of the application or applications to which it corresponds. For example, if two applications B1 and B2 utilize the same logical frame buffer B, then the standardization operation may need to perform an arbitration function between the two applications which access the same logical frame buffer.

Either of steps 302 and 303 may be performed first according to the present invention. For example, in the event that a human determines the standardization operation for a known hardware configuration, step 302 is performed first. However, in the event that a program performs step 302, it may alternatively be performed after the performing of step 303.

The standardization operation using a pre-process having one or multiple pre-functions and a post-process having one or multiple post-functions are thus attached to a graphics bitmap device (either hardware or software) to simplify software design. The pre-process is called before a drawing function is invoked, and the post-process is called after a function has completed.

As another example, if the application writing into the logical frame buffer performs so many draw operations that it is impractical or inefficient to write to the hardware frame buffer 206 every time the logical frame buffer B 212 is changed, then the standardization operation may be constructed such that it accumulates changes to the logical frame buffer and writes to the hardware frame buffer only at predetermined time intervals, or only after a predetermined number of alterations to the logical frame buffer have occurred. At step 303, a logical frame buffer is created corresponding to the program which was invoked at step 301. At step 304, the standardization operation constructed at step 302 is attached to the logical frame buffer such that the standardization operation is automatically invoked whenever a draw operation is performed on the logical frame buffer created in step 303 At step 305, the method returns to continue initialization of the program which caused the invocation of step 301.

Figure 4:
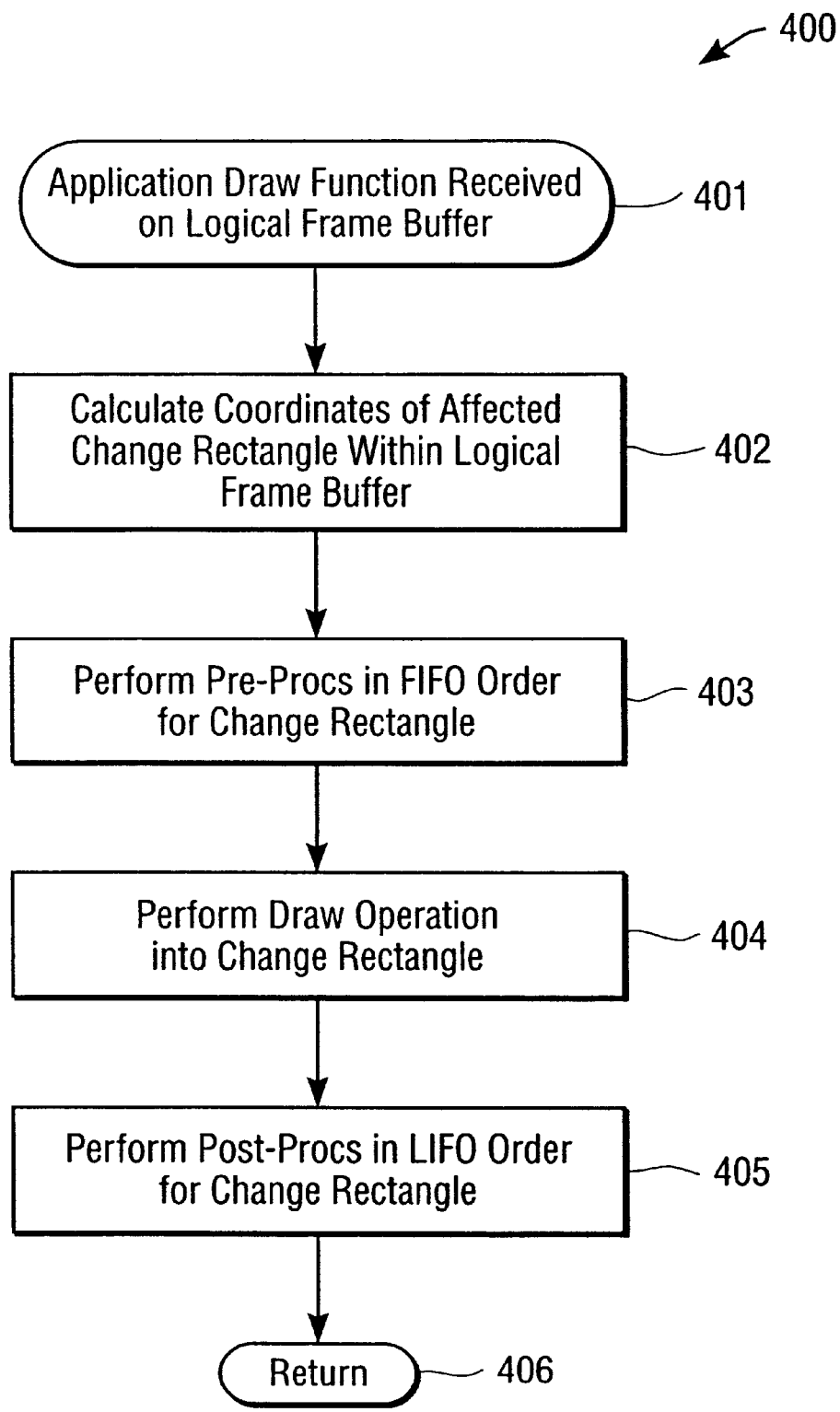
FIG. 4 illustrates a method by which a graphics system according to the present invention processes an invocation of an application draw operation.

FIG. 4 illustrates a method 400 by which a graphics system according to the present invention processes an invocation of an application draw function. At step 401, a graphics system, such as graphics system A 202 shown in FIG. 2 receives an invocation of an application draw function upon logical frame buffer A 209. At step 402, the graphics system A 202 calculates the coordinates of the affected change rectangle within the logical frame buffer A 209. In the example shown in FIG. 2, the application draw function invoked by application A 201 is intended to draw the capital letter "F" into the change rectangle 215 within logical frame buffer A 209. At step 403, the method 400 performs the pre-functions implementing the pre-processes in first-in-first-out order for the change rectangle calculated in step 402. At step 404, graphics system A 202 performs the actual draw operation into change rectangle 215, resulting in the contents of logical frame buffer A 209 being altered such that the capital letter F appears in an upper right hand portion of the logical display space represented by the logical frame buffer A 209. At step 405, the graphics system A 202 performs pre-processes 211 in last-in-first-out order for the change rectangle 215 within the logical frame buffer A 209. The method 400 returns at step 406 to the application A 201 which invoked the application draw function at step 401.

Figure 5A:
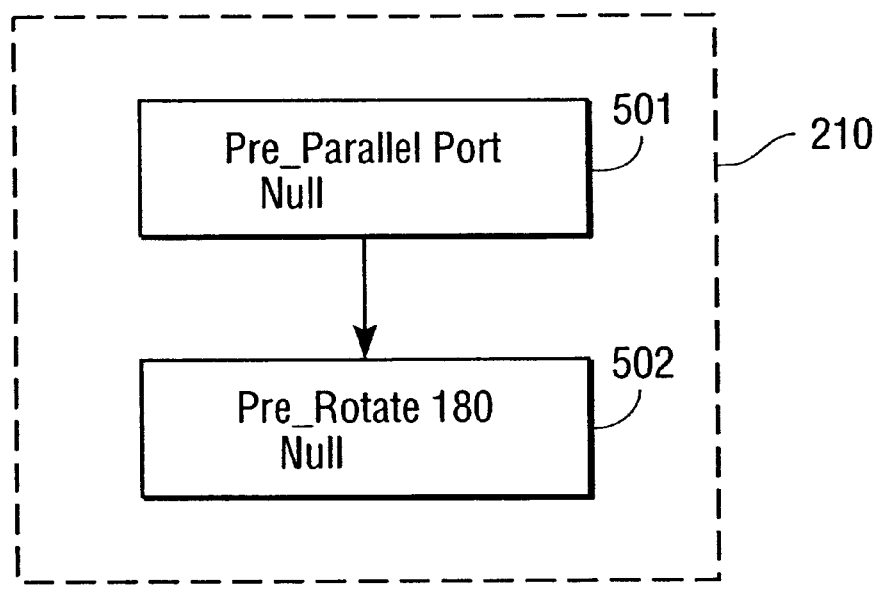
FIG. 5A illustrates pre-processes within a graphics system created by a method according to the present invention which correspond with the post-processes illustrated in FIG. 5B so as to implement two standardization operations suitable for standardizing the graphics system A shown in FIG. 2.
Figure 5B:
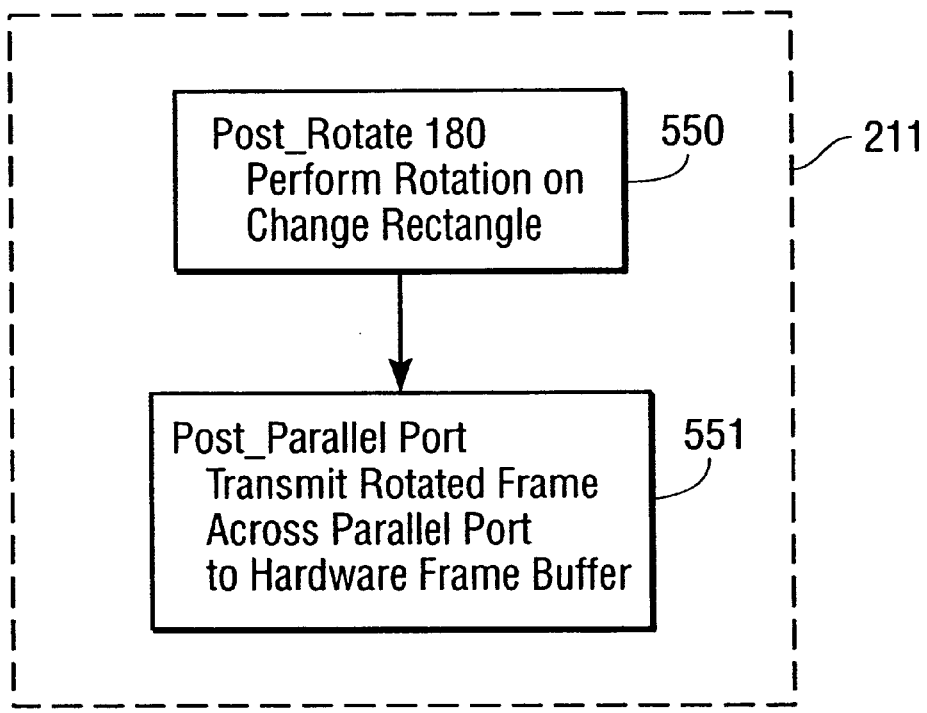
FIG. 5B illustrates post-processes within a graphics system created by a method according to the present invention which correspond to the pre-processes illustrated in FIG. 5A so as to implement two standardization operations suitable for standardizing the graphics system A shown in FIG. 2.

FIG. 5A illustrates pre-processes within a graphics system created by a method according to the present invention which correspond with the post-processes illustrated in FIG. 5B so as to implement two standardization operations suitable for standardizing the graphics system A shown in FIG. 2. For the purposes explanation of FIGS. 5A and 5B, it is assumed that the hardware display device 207 performs a 180° rotation of the bitmapped image stored in hardware buffer 206 before creating display screen appearance 208. Thus, in order to create the display screen appearance 208 showing the capital F 216 in the upper right hand portion, the hardware frame buffer 206 must be written in a rotated form as illustrated by the rectangle 217. It is also assumed that the port 218 into the hardware frame buffer 206 is a parallel port that is not directly memory addressable by the processor 102 shown in FIG. 1. Thus, the pre-process part of the standardization operation includes distinct pre-functions, pre__parallelport 501 and pre__rotate 180 502. In this case, both of the pre-functions 501 and 502 are null operations, because these functions involve the transportation of the contents of the logical frame buffer A 209 to the hardware frame buffer 206, which necessarily are dealt with by post-processes A 211. Although pre-functions 501 and 502 are null, they serve to insure that functions can be arbitrarily combined to create an appropriate standardization operation according to the present invention, as will be explained later.

FIG. 5B shows the post-process A 211 corresponding to the pre-process A 210. Pre-process A 210 and post-process A 211 together implement the standardization operation corresponding to logical frame buffer A 209. Post-function 550 performs a post__rotate 180 function, which performs a rotation on the change rectangle 215 to create an intermediate rectangle (not shown) for transporting into the rectangle 217 illustrated in FIG. 2. The post__parallelport function 551 performs the task of communicating the intermediate rectangle (not shown) calculated in step 550 across the parallel port 218 into the hardware frame buffer 206.

Figure 6A:
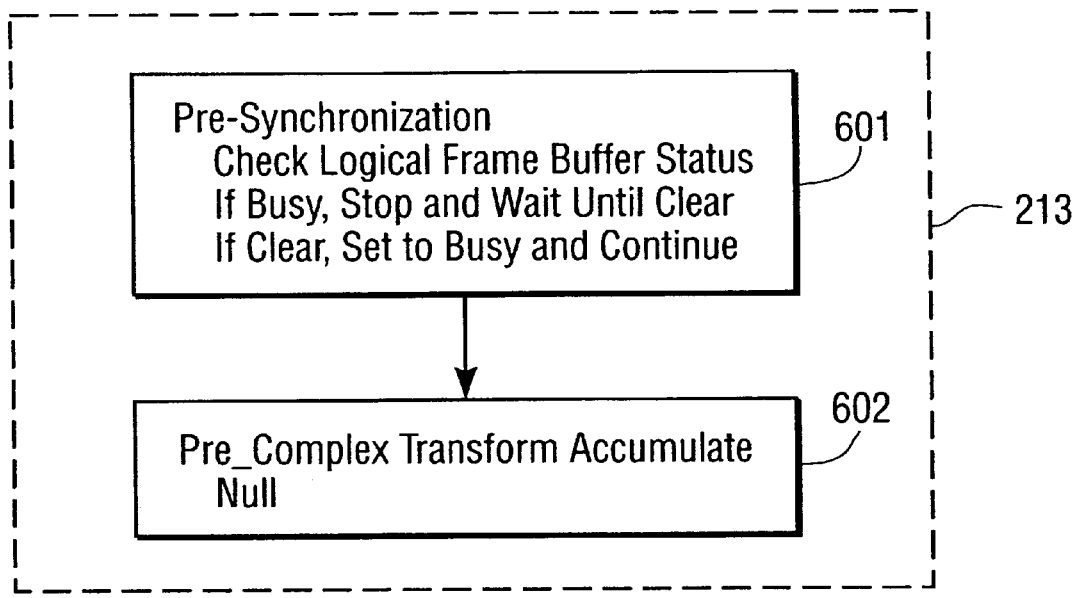
FIG. 6A illustrates pre-processes within a graphics system created by a method according to the present invention which correspond with the post-processes illustrated in FIG. 6B so as to implement two standardization operations suitable for standardizing the graphics system B shown in FIG. 2.

In a complex computer system, it is often desirable to allow multiple computing tasks to access a given frame buffer. Such computing tasks may be operating in a multitasking environment wherein task B1 is performing a lengthy operation on the logical frame buffer and is interrupted by task B2. Synchronization is then required to allow for orderly access to this frame buffer. FIG. 6A illustrates pre-process B 213 shown in FIG. 2, and corresponding to logical frame buffer B 212. Graphics system B 205 performs pre-function 601, which performs controlled access of the logical frame buffer B212 by applications B1 203 and B2 204. Specifically, the pre-function 601 checks to see if the logical frame buffer status is busy or clear. The synchronization function therefore requires a semaphore variable for storing the busy or clear status of the logical frame buffer. If the buffer is busy, then the application draw function which invoked pre-process B 213 stops and waits until the status is cleared by a post-process B 214 corresponding to an invocation of an application draw function by another application. For example, if application B2 204 is currently using the logical frame buffer B 212, then application B1 203 waits until application B2 204 sets the logical frame buffer status to clear before proceeding. Pre-function 602 is null because it relates to a complex transform accumulate function, which is necessarily handled by post-process B 214.

Figure 6B:
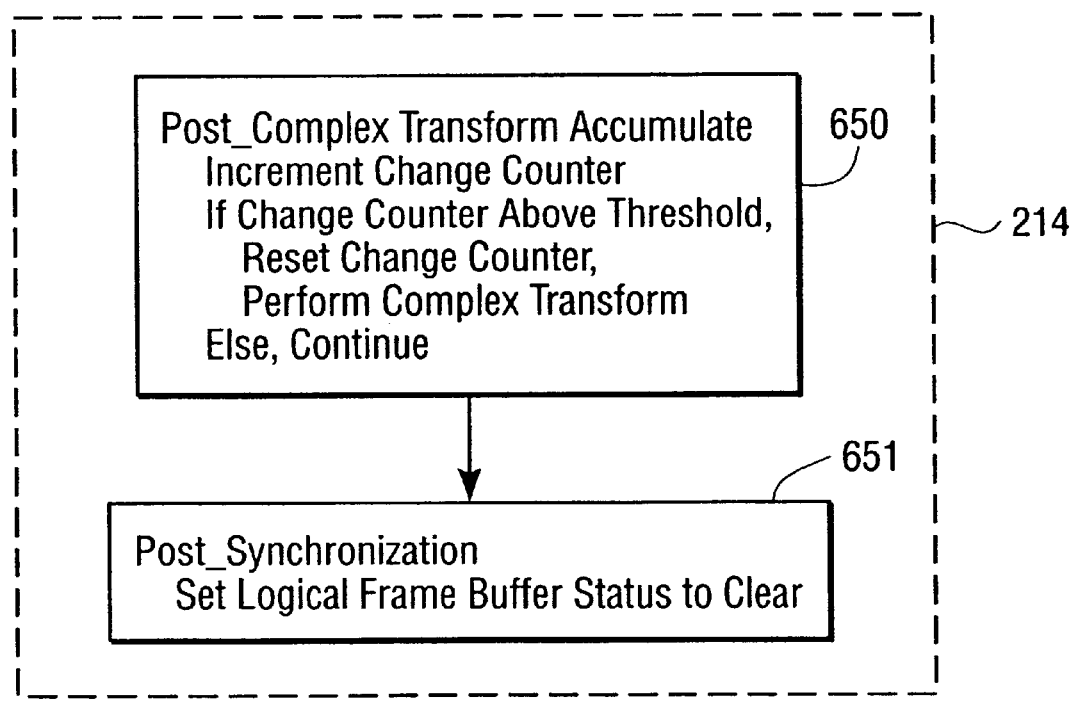
FIG. 6B illustrates post-processes within a graphics system created by a method according to the present invention which correspond to the pre-processes illustrated in FIG. 6A so as to implement two standardization operations suitable for standardizing the graphics system B shown in FIG. 2.

FIG. 6B illustrates the post-process B 214 corresponding to logical frame buffer B 212. Post complex transform accumulate function 650 is responsible for counting the number of changes to the logical frame buffer B 212 which have occurred since the last time that the complex transform was performed Step 650 performs a complex transform on the content of the logical frame buffer B 212 to create an intermediate logical frame buffer (not shown). Because the complex transform is relatively expensive in terms of computing requirements, post complex transform accumulate function 650 performs the complex transform only periodically. As an alternative to the step 650, the complex transform accumulate uses a timer to determine when to perform the complex transform on the logical frame buffer B 212 to produce the intermediate frame buffer (not shown). At step 651, a post-synchronization step sets the logical frame buffer status semaphore to clear, thereby allowing the other application to access the logical frame buffer B 212 if it is waiting. The complementary pre-and post-functions are performed in reverse order, specifically the pre-functions are performed in FIFO order to the order of installation, while post-functions are performed in LIFO order to the order of installation. The synchronization function, implemented by step 601 and 651, exemplifies the reasoning for this ordering of operations. If the post-synchronization function 651 were performed before the post-complex transform accumulate function 650, then it would be possible for another application to begin writing into the logical frame buffer B 212 before the graphic system B 205 had finished its complex transform of the logical frame buffer.

In the example illustrated in FIG. 2, for purposes of explanation of the methods of the present invention, hardware frame buffer 206 includes two write ports 218 and 219. Write port 218 is a parallel port, while port 219 is directly connected to the bus 101 and is addressable by the processor 102. However, in the example illustrated in FIG. 2, application A 201 does not have permission to access the hardware frame buffer 206 through the port 219 as a memory-mapped device, but rather must write through the parallel port 218. Applications B1 203 and B2 204, however, are able to directly access the hardware frame buffer through the port 219.

The standardization operation according to the present invention is capable of solving a variety of problems according to the present invention. For example, in the context of a software cursor, a pre-function removes the cursor prior to the graphics system draw function replacing it with the portion of the image it had covered, and a post-function replaces the cursor after the graphics system draw function has completed and stores the image that the cursor covers. In this manner, the complete and proper screen image without the cursor is modified at all times without losing any information, and without improperly including the cursor as part of the image that is modifiable by draw operations. As another example, when an application must write into multiple hardware frame buffers, a post-function is implemented which performs the multiple bit transfers.

Thus, the present invention allows for clean separation of the complex graphics system code from code that handles hardware devices.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for implementing a bitmapped graphics system, the method comprising the steps of:
   creating a logical frame buffer;
   providing an application draw function; and
   attaching a standardization operation to the logical frame buffer which is automatically executable upon the invocation of the application draw function, wherein the standardization operation comprises a pre-process and post-process, wherein the pre-process is executed prior to invocation of a graphics system draw operation into the logical frame buffer and the post-process is executed subsequent to completion of the graphics system draw operation into the logical frame buffer.

2. A method as in claim 1,
   wherein the pre-process includes a plurality of distinct pre-functions; and
   wherein the post-process includes a plurality of corresponding distinct post-functions.

3. A method as in claim 2,
   wherein the corresponding distinct post-functions are performed in reverse order to the distinct pre-functions, such that the pre-functions are executed in the order of installation, and the post-functions are executed in the reverse order of installation.

4. A method of executing an application draw function into a logical frame buffer by a graphics system, the method comprising steps of:
   receiving an invocation of the application draw function from an application;
   performing a pre-process standardization operation responsive to the invocation of the application draw function;
   performing a graphics system draw operation into the logical frame buffer; and,
   performing a post-process standardization operation.

5. A method as in claim 4,
   wherein the pre-process includes a plurality of distinct pre-functions; and
   wherein the post-process includes a plurality of corresponding distinct post-functions.

6. A method as in claim 5,
   wherein the corresponding distinct post-functions are performed in LIFO order with regard to order of installation and the pre-functions are performed in FIFO order with regard to order of installation.

7. A method as in claim 4,
   wherein the pre-process standardization operation comprises a cursor hide function; and
   wherein the post-process standardization operation comprises a cursor show function.

8. A method as in claim 4,
   wherein the post-process standardization operation comprises a transform function for performing a rotation on the logical frame buffer.

9. A method as in claim 4,
   wherein the post-process standardization operation comprises a communication function for transporting contents of the logical frame buffer to a hardware frame buffer.

10. A method of executing an application draw function into a logical frame buffer by a graphics system, the method comprising steps of:

receiving an invocation of the application draw function from an application;

performing a pre-process standardization operation;

performing a graphics system draw operation into the logical frame buffer;

performing a post-process standardization operation;

wherein the pre-process includes a plurality of distinct pre-functions;

wherein the post-process includes a plurality of corresponding distinct post-functions;

wherein the corresponding distinct post-functions are performed in LIFO order with regard to order of installation and the pre-functions are performed in FIFO order with regard to order of installation;

wherein one of the plurality of distinct pre-functions includes a synchronization pre-process for maintaining controlled access to the logical frame buffer by two or more applications; and wherein a corresponding one of the plurality of distinct post-functions includes a synchronization post-process for releasing control of the logical frame buffer.

11. A computer readable storage medium comprising:

computer readable program code embodied on said computer readable storage medium, said computer readable program code for programming a computer to perform a method for implementing a bitmapped graphics system, the method comprising the steps of:

creating a logical frame buffer;

providing an application draw function; and attaching a standardization operation to the logical frame buffer which is automatically executable upon the invocation of the application draw function, wherein the standardization operation comprises a pre-process and post-process, wherein the pre-process is executed prior to invocation of a graphics system draw operation into the logical frame buffer and the post-process is executed subsequent to completion of the graphics system draw operation into the logical frame buffer.

12. A computer readable storage medium comprising computer readable program code as in claim 11, wherein the pre-process includes a plurality of distinct pre-functions; and wherein the post-process includes a plurality of corresponding distinct post-functions.

13. A computer readable storage medium comprising computer readable program code as in claim 12, wherein the corresponding distinct post-functions are performed in reverse order to the distinct pre-functions, such that the pre-functions are executed in the order of installation, and the post-functions are executed in the reverse order of installation.

14. A computer readable storage medium comprising:

computer readable program code embodied on said computer readable storage medium, said computer readable program code for programming a computer to perform a method for executing an application draw function into a logical frame buffer by a graphics system, the method comprising the steps of:

receiving an invocation of the application draw function from an application;

performing a pre-process standardization operation responsive to the invocation of the application draw function;

performing a graphics system draw operation into the logical frame buffer; and, performing a post-process standardization operation.

15. A computer readable storage medium comprising computer readable program code as in claim 14, wherein the pre-process includes a plurality of distinct pre-functions; and wherein the post-process includes a plurality of corresponding distinct post-functions.

16. A computer readable storage medium comprising computer readable program code as in claim 15, wherein the corresponding distinct post-functions are performed in LIFO order with regard to order of installation and the pre-functions are performed in FIFO order with regard to order of installation.

17. A computer readable storage medium comprising computer readable program code as in claim 14, wherein the pre-process standardization operation comprises a cursor hide function; and wherein the post-process standardization operation comprises a cursor show function.

18. A computer readable storage medium comprising computer readable program code as in claim 14, wherein the post-process standardization operation comprises a transform function for performing a rotation on the logical frame buffer.

19. A computer readable storage medium comprising computer readable program code as in claim 14, wherein the post-process standardization operation comprises a communication function for transporting contents of the logical frame buffer to a hardware frame buffer.

20. A computer readable storage medium comprising:

computer readable program code embodied on said computer readable storage medium, said computer readable program code for programming a computer to perform a method for executing an application draw function into a logical frame buffer by a graphics system, the method comprising steps of:

receiving an invocation of the application draw function from an application;

performing a pre-process standardization operation;

performing a graphics system draw operation into the logical frame buffer;

performing a post-process standardization operation;

wherein the pre-process includes a plurality of distinct pre-functions;

wherein the post-process includes a plurality of corresponding distinct post-functions;

wherein the corresponding distinct post-functions are performed in LIFO order with regard to order of installation and the pre-functions are performed in FIFO order with regard to order of installation;

wherein one of the plurality of distinct pre-functions includes a synchronization pre-process for maintaining controlled access to the logical frame buffer by two or more applications; and wherein a corresponding one of the plurality of distinct post-functions includes a synchronization post-process for releasing control of the logical frame buffer.

* * * * *